Aug. 24, 1943.        W. L. HORNER        2,327,642
METHOD AND APPARATUS FOR MEASURING POROSITY OF SOLIDS
Original Filed Jan. 3, 1938
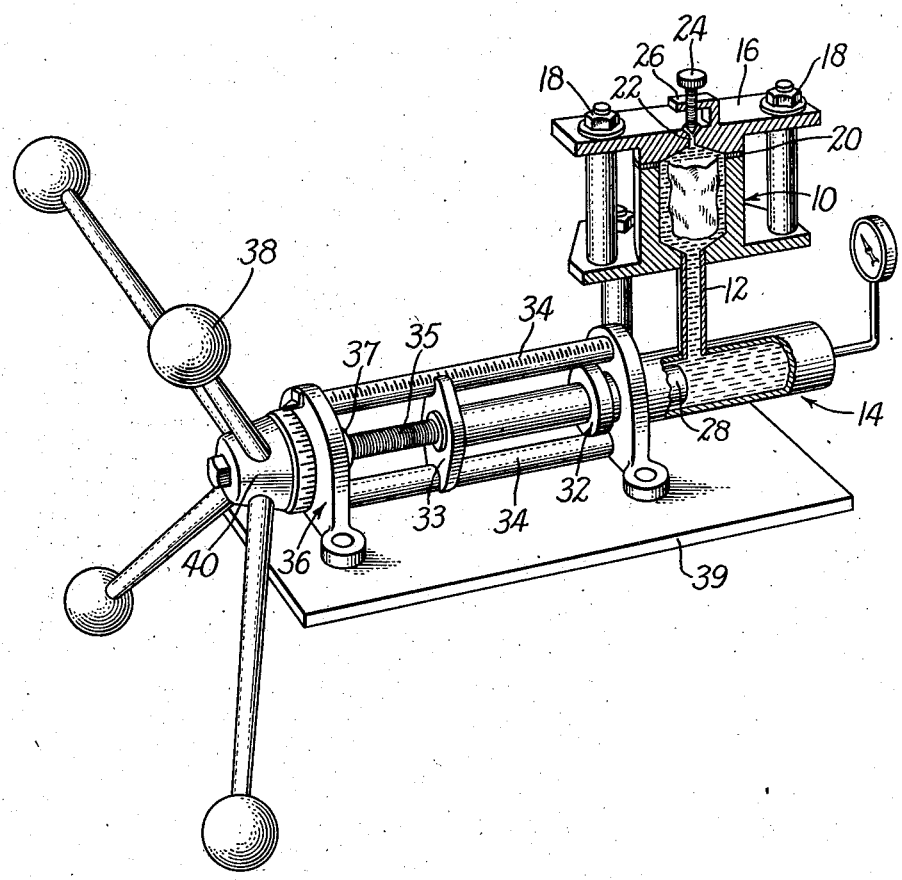
INVENTOR
William L. Horner
BY
Blair, Curtis + Hayward
ATTORNEYS Patented Aug. 24, 1943

2,327,642

UNITED STATES PATENT OFFICE 2,327,642

METHOD AND APPARATUS FOR MEASURING POROSITY OF SOLIDS

William L. Horner, Dallas, Tex., assignor to Core Laboratories, Inc., Dallas, Tex., a corporation of Delaware Original application January 3, 1938, Serial No. 183,018. Divided and this application August 8, 1940, Serial No. 351,891

13 Claims. (Cl. 73—51)

This invention relates to a method and apparatus for determining the pore space of a porous body and more particularly for determining the pore space of porous sandstone or other porous rock or earth formations. The present application is a division of my application Serial No. 183,018, filed January 3, 1938.

One of the quantitative measurements made on core samples taken from sands through which oil wells are drilled is that of porosity, i. e. the percentage of space of the sample occupied by pores. Further, pores of such a core sample may be filled with liquid or gas, or both, and it is desirable to know the pore space filled by gas alone.

The present invention provides an improved method and apparatus for rapidly measuring the percentage of pore space, or the percentage of space occupied by gas, and the method and apparatus work satisfactorily on either hard or soft core samples.

One embodiment of this method comprises measuring the volume of a sample of the core by liquid-displacement and in such a way that free gas present in pores of the sample is not interfered with, and subsequently measuring the volume of the pore space occupied by the gas. In the present embodiment this latter step is accomplished by forcing a non-compressible liquid in which the sample is immersed into the pores to compress and supplant the gas therein, and measuring the volume of the liquid required to supplant the gas. The reading thus obtained is then translated into percent gas per unit volume of the sand by dividing the latter measurement by the measurement of the total volume.

In using this method of analysing the free gas content or the amount of pore space of a porous body, it is desirable to use a liquid which does not chemically react with the materials comprising the sample and which has a surface tension such that the liquid does not penetrate the pores without being forced into them. One liquid that I have found which fulfills these requirements is mercury.

Other liquids, however, may be used which have a surface tension such as to wet the sample being analysed, and when using such liquids, the sample may first be coated with collodion which may serve to prevent the sample from being wetted by the liquid but which does not prevent subsequent penetration of the liquid through the coating.

In carrying out the method a sample chamber having a suitable air vent at its top and an inlet in its bottom is shaped so that as a non-compressible liquid is flooded into the chamber through the bottom all gas is driven out of the chamber ahead of the liquid as the liquid reaches the vent. The amount of liquid thus required to fill the chamber is suitably measured and the liquid is then at least partially withdrawn from the chamber.

A core sample is now suitably shaped and trimmed to eliminate pits and cavities on its surface that might retain air bubbles and reduced to a size receivable by the sample container. The sample is then placed in the container. The liquid is again flooded into the chamber and the amount of liquid required to fill the chamber with the sample is noted, the difference between this reading and the former reading being a measurement of the volume of the sample. The vent is now closed and the liquid is subjected to a pressure of, for example, 50 atmospheres, which causes the liquid to penetrate the pores, compressing and supplanting the gas present so that it occupies one-fiftieth of the volume that it normally would occupy at atmospheric pressure. The volume of the liquid thus entering the pores of the sample is measured and may be corrected upwards by two percent to compensate for the residual volume of the gas at 50 atmospheres.

From this reading, and the former reading of the volume of the sample, is obtained the fraction of the core volume occupied by free gas.

Further, the rate at which the liquid enters the core pores under 50 atmospheres of pressure may be taken as an indication of the permeability of the core sample, i. e. the resistance of the sample to the flow of fluid through it.

Referring to Figure 1, the apparatus is shown for carrying out the method described above. A sampling chamber generally indicated at 10 is connected through an inlet 12 with a plunger chamber indicated at 14 of a mercury pump. The chamber 10 is closed at its top by a suitable cover plate 16 which may be bolted in place by bolts 18 after the sample is placed in the chamber. The joint between cover and chamber is made fluid-tight by a suitable gasket 20. The inside of the cover is conically shaped, as shown, and provided with a small vent 22 at the apex of the cone. The small outlet may be closed off by a needle valve 24 which is suitably threaded down through a support 26 to set in the opening 22.

With this construction the sample may be placed in the chamber while the chamber is empty by simply removing the cover 16 and then bolting the cover back on. It is possible to tell when the chamber is full of mercury with no occluded air by filling the chamber with mercury until the mercury appears in the small vent 22.

The inlet 12 of the chamber 10 communicates with the plunger chamber in which a plunger 28 is reciprocally mounted, and passes out of the chamber through suitable bearing and stuffing box generally indicated at 32. The outer end of the plunger carries a slider 33 sliding along suitable guide rods 34. Further, the plunger is hollow and threaded to receive a plunger-operating screw 35 one end of which is suitably rotatably mounted in thrust bearings generally indicated at 36 mounted in a journal 37 secured with respect to the plunger chamber 14 by means of a heavy base 39 and the guide rods. Keyed to the operating screw 35 is a hand-wheel 38 used for operating the screw.

The top guide rod 34 is suitably marked off in units of measurement such, for example, as cubic centimeters, and the hub of the hand-wheel is also suitably marked in cubic centimeters, but in thousandths of cubic centimeters and in accordance with the pitch of the threads on the operating screw so that the position of the plunger may be read in terms of cubic centimeters and hundredths of cubic centimeters from the scale on the guide rod and in thousandths of cubic centimeters from the scale on the hub 40.

The end of the plunger chamber opposite the end through which the plunger enters is connected to a suitable pressure gauge, as shown.

The instrument is thus calibrated so that the amount of mercury measured in cubic centimeters put into or taken out of the chamber may be read from the indices associated with the plunger 28 and its operating mechanism.

In making a determination of a sample with the cover bolted on and the needle valve 24 open the plunger is moved inwardly by the hand-wheel until mercury appears at the outlet 22, and the position of the plunger is noted from the scale. The plunger is then retracted and the lid taken off and the sample, suitably prepared, is put into the chamber and the lid bolted back on. With the needle valve still open the plunger is again moved inwardly by the hand-wheel until the mercury again appears at the outlet 22 at which time the position of the plunger is again noted. From the difference of the two readings the volume of the sample is obtained. The needle valve is now closed and the hand-wheel is operated to move the plunger inwardly to maintain a pressure on the gauge equivalent to 50 atmospheres, the hand-wheel being moved as fast and for such length of time as is required to maintain this pressure. After it is no longer necessary to move the hand-wheel to keep the pressure at 50 atmospheres, the readings on the two scales are again noted and the difference between this reading and the last succeeding reading gives correctly the volume of mercury necessary to compress the gas in the sample and to fill the pore space occupied by the gas. This latter reading, as above pointed out, is increased by two percent in order to take care of the volume of space occupied by the gas now under 50 atmospheres of pressure. By dividing the gas space volume thus obtained by the volume of the sample and multiplying by one hundred the percent gas space per unit volume is obtained.

Also by noting the length of time required for the mercury to enter the pores a measure of the permeability is obtained. This procedure may be carried out rapidly and a large number of samples may be thus analysed in a short period of time.

With regard to the permeability, I have found that working with a sample of from one to four cubic inches, if more than 95% of the mercury enters the pores at 50 atmospheres in less than one second, the sand is sufficiently permeable for oil production.

As various embodiments might be made of this invention, and as various changes might be made in the construction herein described, all without departing from the scope of the invention, it is to be understood that all matter herein set forth or shown in the accompanying drawing is to be interpreted as illustrative and not in a limiting sense.

I claim:

1. In the art of measuring in a porous body the space filled with gas, the method comprising determining the volume of a sample of the body by immersing it in liquid, forcing the liquid under pressure into the pores of said body to compress the gas in said pores and to occupy the space occupied by the gas, and measuring the liquid while under pressure necessary thus to supplant the gas.

2. The method of measuring the amount of free gas in the pores of a porous body, comprising immersing the body in a liquid whose surface tension and chemical properties are such that it does not of itself enter the pore spaces, to determine the volume of the body, causing the liquid to enter the pore spaces to supplant the gas, and measuring the amount of liquid thus required while under pressure.

3. The method of measuring in a porous body the pore space filled by gas, comprising, coating the body with a substance to render it impervious to liquids, immersing the body thus coated in liquid to measure the volume of the body, causing the liquid to penetrate the coating and to supplant the gas, and measuring the volume of the liquid thus needed.

4. The method of measuring in a porous body the pore space filled by gas, comprising, coating a sample of the body with a substance to render it impervious to liquids, immersing the sample thus coated in a body of liquid to measure the volume of the sample, subjecting to pressure the liquid in which the sample is immersed to cause it to penetrate the coating and to supplant the gas in the pore space, and measuring the amount of liquid required thus to fill the pore space.

5. The method of determining in a porous body the pore space occupied by gas, comprising the steps of, immersing the body in mercury to determine the volume of the body, forcing the mercury under pressure into the pore space to compress and supplant the gas while the body is still immersed in the mercury, and measuring the amount of mercury while under pressure needed to supplant the gas.

6. The method of simultaneously measuring the permeability of a porous body whose pores are at least partially filled with gas, and measuring the percentage of free gas in the body, comprising, immersing the body in a liquid to obtain the volume of the body, subjecting the liquid to a substantially constant elevated pressure to cause it to enter the pores and compress the gas therein, measuring the time required for the liquid thus to supplant the gas, and measuring the amount of liquid required to supplant the gas.

7. In apparatus for measuring the free gas content of a porous body, in combination, a sample chamber having a removable top conically recessed on its inside surface and provided with an outlet at the apex of the conical surface, means for closing the outlet, means for forcing mercury into said chamber, means for measuring the mercury forced into said chamber and means for measuring the pressure of said mercury.

8. In apparatus for measuring the amount of pore space of a porous body occupied by compressible gas, in combination, a chamber, a removable top for said chamber having a concavely shaped interior, an outlet extending from the top of the cavity of said cover to the outside thereof, a needle valve adapted to be moved into closing or opening positions, an inlet at the bottom of said chamber, a mercury pump adapted to force mercury into said chamber through said inlet to force mercury into the pores of a sample in said chamber, and means for measuring the amount of mercury thus forced into the pores of said sample.

9. The method of measuring the permeability of a non-compressible porous body, the pores of which are at least partially filled with a gas, comprising immersing the body in a liquid, subjecting the liquid to a substantially constant elevated pressure to cause it to enter the pores and displace gas by compressing it therein, and noting the amount of liquid which thus enters and the time required for such entrance as an indication of the permeability of said body.

10. The method of measuring the permeability of a non-compressible porous body, the pores of which are at least partially filled with a gas, comprising immersing the body in a liquid whose surface tension and chemical properties are such that it does not of itself enter the pore spaces, subjecting the liquid to a substantially constant elevated pressure to cause it to enter the pores and displace gas by compressing it therein, and noting the amount of liquid which thus enters and the time required for such entrance as an indication of the permeability of said body.

11. The method of measuring the permeability of a non-compressible porous body, the pores of which are at least partially filled with a gas, comprising coating the body with a substance to render it impervious to liquids, immersing the body in a liquid, subjecting the liquid to a substantially constant elevated pressure to cause it to penetrate the coating and enter the pores and displace gas by compressing it therein, and noting the amount of liquid which thus enters and the time required for such entrance as an indication of the permeability of said body.

12. The method of measuring the permeability of a non-compressible porous body, the pores of which are at least partially filled with a gas, comprising immersing the body in mercury, subjecting the mercury to a substantially constant elevated pressure to cause it to enter the pores and displace gas by compressing it therein, and noting the amount of mercury which thus enters and the time required for such entrance as an indication of the permeability of said body.

13. In apparatus for measuring the free gas content of a porous body, in combination, a sample chamber having a removable top concavely shaped on its inside surface and provided with an outlet at the top of said surface, means for closing said outlet, means for forcing a liquid into said chamber and to subject the liquid therein to a desired pressure, means for measuring the liquid thus forced into said chamber, and means for measuring the pressure of said liquid.

WILLIAM L. HORNER.